Oct. 6, 1953     R. E. DERBY     2,654,122
METHOD OF REMOVING THE SKIN FROM HOGS
Filed July 24, 1951
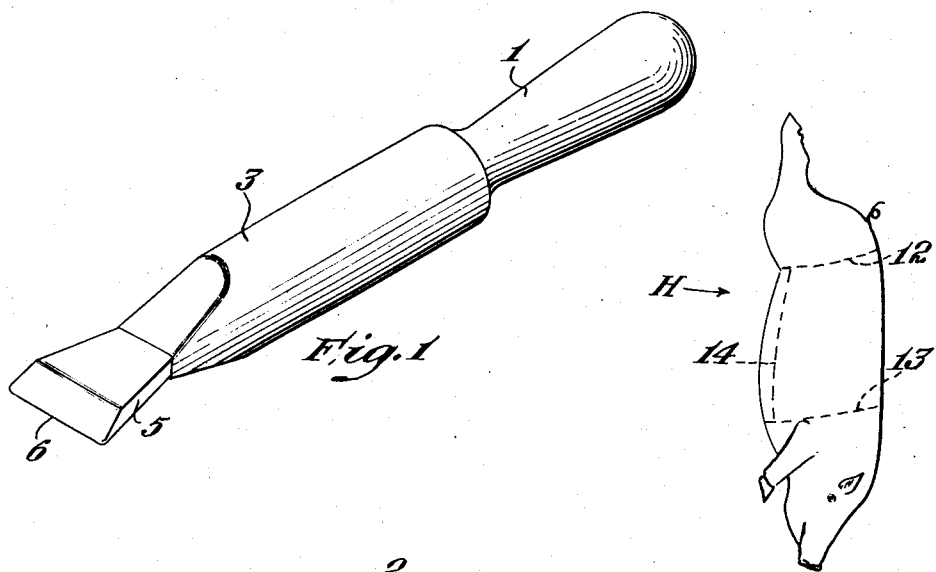
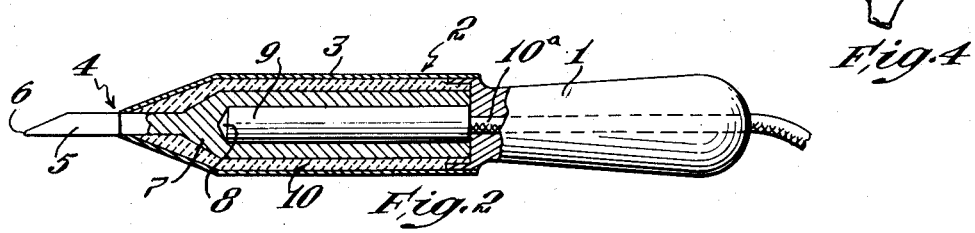
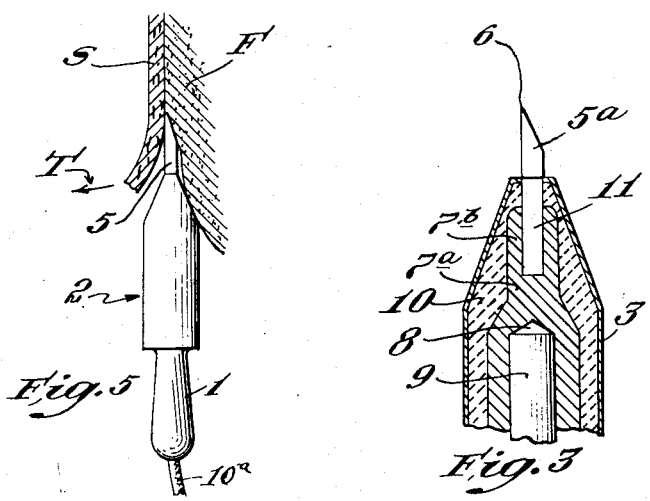
Inventor
Ralph E. Derby
by Roberts Cushman Grover
att'ys.

Patented Oct. 6, 1953

2,654,122

UNITED STATES PATENT OFFICE 2,654,122

METHOD OF REMOVING THE SKIN FROM HOGS

Ralph E. Derby, Salem, Mass.

Application July 24, 1951, Serial No. 238,296

6 Claims. (Cl. 17—45)

This invention pertains to a method of removing the skins or hides from hogs. The skins of most animals, for example sheep and cattle, are attached to the carcass by a layer of relatively loose connective tissue, and in skinning such animals this connective tissue is quite readily severed. Although vestiges of this tissue may remain attached to the skin or meat, this tissue provides a reasonably clean line of separation between the two, and such vestiges as may remain are easily removable. On the other hand, hogs do not have such a layer of tissue or if it does exist it is wholly lost in the layer of fat which underlies the skin and tenaciously unites the skin to the lean meat or muscle tissue. Hog skins make a valuable leather, having certain unique characteristics making it highly desirable, for instance for use as a lining for shoes or in glove manufacture (after it has been skived to the desired thickness) and thus such leather might well replace sheepskin or doeskin commonly employed for such purposes. However, because of the presence of the fat layer immediately beneath the skin and which adheres very firmly to the skin, it is a difficult operation to remove a hog skin from the carcass, at least in large pieces. Such hog skins as are available for leather manufacture, usually come from countries where labor is extremely cheap and where it is practical to separate the skin from the carcass little by little in a slow and laborious operation. Because of this difficulty of removing hog skins, although such skins are highly useful for making high grade leather, the packing industry in this country has found it impractical to try to save hog skins for tanning, although relatively small pieces, for example, those skived from bacon, are sometimes tanned.

The present invention has for one of its objects the provision of a novel method of removing hog skins, or so much thereof as is desired, in large sections (for example from the entire body, excluding the legs and heads) and which, after being tanned, are of general use in the same way as tanned cowhides or sheepskins. A further object of the present invention is to provide a novel method of peeling the skin from the body of a hog in one piece and so expeditiously as to make the removal of the skins from hogs slaughtered in this country a commercially practical matter. A further object is to provide a method of removing hog skins such as to leave but little fat adherent to the skin. Other and further objects and advantages of the invention will be pointed out in the following more detailed description and by reference to the accompanying drawings wherein Fig. 1 is a perspective view of an implement useful in removing hog skins in accordance with the method of the present invention;

Fig. 2 is a side elevation, partly in vertical section, of the implement shown in Fig. 1;

Fig. 3 is a fragmentary section, illustrating a slight modification;

Fig. 4 is a diagrammatic elevation, to small scale, of a hog carcass ready for skinning and indicating suggested preliminary steps in the practice of the present method; and Fig. 5 is a diagrammatic section, through the skin and adjacent fat layer of a hog's carcass, showing the method of the present invention in separating the skin from the fat layer.

Referring to the drawings wherein there is disclosed, by way of example, one desirable appliance for use in the practice of the present method, the numeral 1 indicates the handle of the implement, this handle being rigidly united in any suitable manner to the rear end 4 of a blade holder 2, here shown as comprising a substantially cylindrical casing 3 of a material which is not injured by moisture or by the substances contained in the skin or adjacent tissues of a hog carcass. For example, this casing 3 may be of stainless steel or a suitable synthetic resin. As here illustrated, the forward end of this casing is tapered and has an opening or slot at its tip through which projects the blade 5. This blade is of metal, preferably stainless steel, or carbon steel protected by a non-corrosive metal such as chromium or nickel; the blade terminating in a beveled edge portion, the edge 6 being designed to be introduced between the skin of the hog and the underlying layer of fat. Desirably the edge 6 is of substantial width, for example 1½ inches or more, and although preferably this edge would be reasonably sharp it may be slightly rounded or dull in order to avoid injury to the skin which is being peeled off. For the same reasons the corners of the blade, at the edge 6, are preferably slightly rounded. As illustrated in Fig. 2, the blade is permanently secured, for example by an integral connection or welding, to the forward end of a metallic housing 7 which is preferably of substantial thickness to provide a good path for the conduction of heat and which has an internal cavity 8 for the reception of an electrical heating unit 9 which receives current through a flexible conductor 10ª extending through an axial bore in the handle 1. The external dimensions of the housing 7 are such as to provide a substantial space between the housing and the casing 3 and this space is filled with heat-insulating materials 10 such, for example, as asbestos or mineral wool.

In a slight modification illustrated in Fig. 3, similar parts are denoted by similar numerals, but in this arrangement the forward end portion 7b of the heat conducting housing 7a is provided with a socket into which the rear part 11 of the blade 5a is fitted, for example with a friction fit, so that the blade may be removed from the socket for replacement by a new blade or by a blade of different dimensions or shape.

In the use of this implement and assuming that the skin S (Fig. 5) is to be removed from the body portion of the carcass of the hog H it is desirable to provide preliminary incisions at the starting and stopping points such, for example, as the incisions 12 and 13 (Fig. 4) located immediately forward and to the rear of the hind legs and forelegs respectively of the hog. It may also be desirable to provide a longitudinally extending incision connecting the incisions 12 and 13, such as the incision 14 (Fig. 4).

Having provided one or all of these incisions, the edge of the skin S at one of these incisions is loosened slightly from the underlying material and tensioned outwardly in the direction of the arrow T (Fig. 5) and then the edge 6 of the skinning implement of the present invention is introduced between this outwardly tensioned margin of the skin and the underlying fatty tissue F (as shown in Fig. 5). It is assumed that the heating unit 9 has been supplied with current and that as a consequence the housing 7 has become heated so that heat has flowed into the blade 5, raising the edge 6 of the latter to a temperature sufficient to melt hog fat, that is to say a temperature of the order of 100° F., more or less, and preferably (to insure rapid action) substantially hotter than that, although not sufficient to cause the smoking and browning of hog fat. When the edge 6 of this hot blade 5 is applied to the inner surface of the outwardly tensioned skin, the fat which adheres directly to the inner surface of the skin proper is rapidly melted and permits more of the skin to be peeled away very easily from the underlying fatty tissue, the edge 6 of the implement being pushed progressively along while in contact with the inner surface of the skin, the net result being that the skin may be peeled off rapidly from the underlying fatty tissue leaving the inner surface of the skin substantially free from adherent fatty tissue. The skinning implement may be thus progressed, for example, from one of the incisions 13 to the other incision 12, separating the skin from the fatty tissue through a width equal to the width of the blade and then the blade may be started again at the first incision and another area of the same width separated from the fatty tissue, and so on, until the entire area of the body skin has been separated from the fat. Any other convenient way of progressing the peeling operation may be employed according to the wishes of the operator and as may be found best from experience.

As above noted, it is desirable that the blade 5 be kept at a temperature substantially above that necessary to melt hog fat in order that the blade may be progressed rapidly without having to wait substantially for the fat to melt at any given point. However, since the blade is thus progressed rapidly in the intended operation of the device, it is permissible to have the blade at a temperature approaching the fat browning temperature, due to its rapid motion, and because the edge of the blade itself contacts the fat through but a small area. On the other hand, it is very desirable to prevent the hot housing 7 from contacting the hog fat since this housing will usually be heated to a temperature above that which would brown hog fat in order to insure the desired rapid flow of heat to the edge of the blade. For this reason the housing 7 is encased in the insulating layer 10, and to keep the implement sanitary the insulating layer is encased in the outer casing 3 which is preferably smoothly polished and as above noted, of metal or other material not easily corroded. It will, of course, be understood that the current supplied to the heating unit 9 may be controlled through a thermostat or other automatic device (not shown) so as to maintain a substantially uniform temperature at the edge of the blade 6.

While a desirable embodiment of the invention has herein been disclosed by way of example it is to be understood that the invention is broadly inclusive of any and all modifications falling within the scope of the appended claims.

I claim:

1. That method of removing the skin from the carcass of a hog which comprises as steps severing the bond which unites the skin to the carcass by applying heat adjacent to the inner surface of the skin sufficient to melt the fat layer which adheres to the skin but insufficient to cause browning of the fatty tissue.

2. That method of removing the skin from the carcass of a hog which comprises as steps applying heat, sufficient to melt hog fat but insufficient to brown fatty tissue, closely adjacent to the inner surface of the skin thereby melting a thin layer of the fat, and thereby so weakening the bond between the skin and carcass that the skin may readily be separated from the carcass.

3. That method of removing the skin from the carcass of a hog which comprises as steps applying heat, sufficient to melt hog fat but insufficient to brown fatty tissue, closely adjacent to the inner surface of the skin thereby melting a thin layer of the fat, thereby weakening the bond between the skin and carcass, and tensioning the skin away from the carcass thereby to separate it from the latter.

4. That method of removing the skin from the carcass of a hog which comprises as steps forming an incision through the skin, applying tension to the skin at the edge of said incision tending to pull the skin away from the carcass, applying heat, insufficient to brown fatty tissue but sufficient to melt hog fat, along a line parallel to said incision and closely adjacent to the inner surface of the skin thereby destroying the bond between the skin and the underlying fat, and progressively advancing the line of application of heat while continuing to apply tension to the skin thereby peeling the skin away from the carcass.

5. That method of removing the skin from the carcass of a hog which comprises as a step melting a thin layer of the fat which adheres to the inner surface of the skin thereby so weakening the bond between the skin and carcass as to allow the skin easily to be pulled away from the carcass.

6. That method of removing the skin from the carcass of a hog which comprises as steps making an incision through the skin, tensioning the skin along the incision away from the carcass, subjecting the fat which adheres to the inner surface of the skin to heat applied along a line parallel to the incision and close to the inner surface of the skin thereby melting a thin layer of the fat and so freeing the skin from the carcass adjacent to said incision, and advancing the line of application of heat away from the incision while continuing to tension the skin away from the carcass thereby progressively peeling off the skin.

RALPH E. DERBY.

References Cited in the file of this patent

UNITED STATES PATENTS

| Number | Name | Date |
| --- | --- | --- |
| 77,724 | Eschenlohr | May 12, 1868 |
| 1,265,407 | Wallin | May 7, 1918 |
| 1,584,392 | Markle et al. | May 11, 1926 |
| 1,926,520 | Fox | Sept. 12, 1933 |
| 2,062,998 | Peterson | Dec. 1, 1936 |
| 2,544,437 | Stow | Mar. 6, 1951 |